Dec. 4, 1928.
G. I. WORLEY
1,693,833
BAND FOR USE WITH TRACTORS OR THE LIKE
Filed Sept. 24, 1925
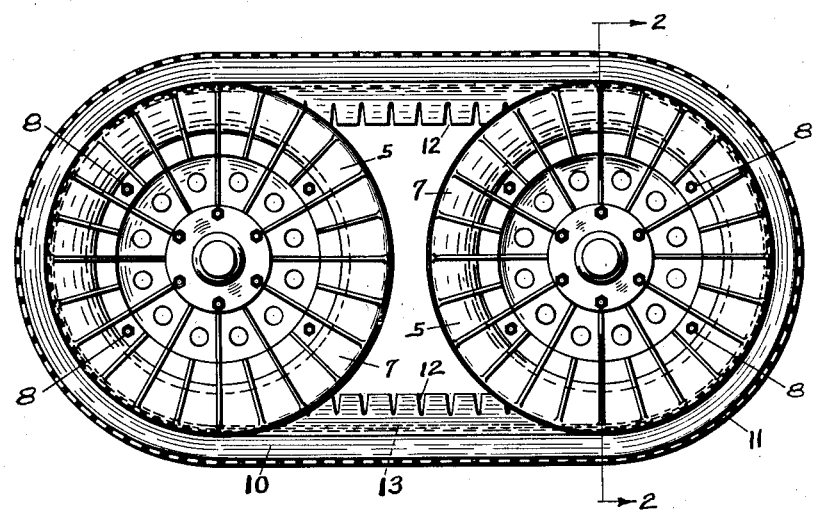
Fig-1
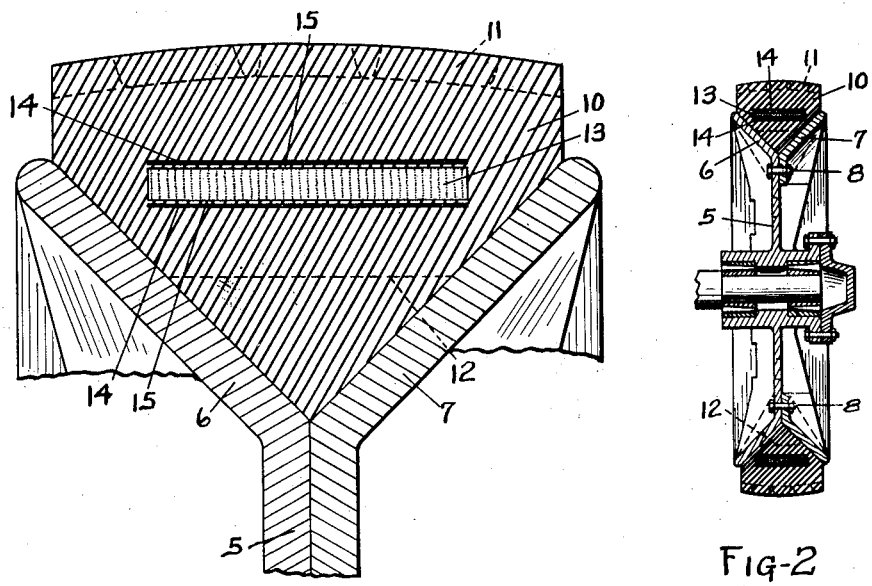
Fig-3
Fig-2
INVENTOR.
GEORGE I. WORLEY
BY
ATTORNEY.

Patented Dec. 4, 1928.

1,693,833

UNITED STATES PATENT OFFICE.

GEORGE I. WORLEY, OF AKRON, OHIO.

BAND FOR USE WITH TRACTORS OR THE LIKE.

Application filed September 24, 1925. Serial No. 58,306.

This invention relates to endless belts such as may be applied to tractor appliances of the type in which an endless belt or trackway is arranged about a set of wheels by which the vehicle is supported and driven. The belt shown and described herein is designed for use particularly with two grooved wheels, one of which is intended to be power-driven, the entire unit being adaptable for trucks or other heavy vehicles which are required to traverse varied roads and soils, as, for example, in the hauling of dirt in excavating or filling jobs.

The features of the invention will be pointed out during the detailed description of the invention, but it will be understood that the invention is not intended to be limited beyond the true scope thereof as set forth in the claims herein.

In the drawings, which show the embodiment of the invention preferred by me at the present time, Figure 1 is a side elevation of a couple or unit constituting the invention;

Figure 2 is a section on the line 2—2 of Figure 1; and

Figure 3 is an enlarged cross-section showing the detailed construction of the device.

I have not shown and described herein the detailed construction of the wheels or power mechanism of the vehicle as the present invention relates wholly to the endless band or tire and to its construction which is particularly designed for heavy duty over soft, sandy or slippery ground and which is at the same time suitable for relatively high speed over hard or paved roads.

The supporting unit arranged upon either side of the vehicle consists of two wheels 5, one of which is driven and the other an idler, although the number and arrangement of the wheels may be varied if found desirable. The outer periphery of each wheel is formed with an angular or V-shaped groove and in the construction shown the groove is formed by integral, inclined flange 6 at one side of the wheel and a removable flange 7 on the other side, this flange being secured by a plurality of bolts 8 which may be removed to remove the tire.

The tire or endless tread, indicated at 10, is in the form of a continuous band which is appropriately triangular in cross-section, the apex of the triangle being designed to fit the V-shaped groove in the wheel. The body of the tire is composed of a tough, resilient band of rubber, preferably of a character similar to that used in the tread of automobile tires, this character and composition of rubber being admirably adapted for work to be performed. The outer surface of the tire is formed with non-skid projections or depressions 11, such as ordinarily used in the treads of automobile tires, and the inner surface at the apex of the tire is formed with a plurality of transverse notches or cuts 12 which are designed to permit the tire to flex readily about the wheels.

In order to prevent excessive stretching and elongation of the band, there is incorporated within the body a reinforcement embodying a plurality of cords arranged longitudinally of the band. For this purpose a strip of rubberized, cotton fabric, such as used in the manufacture of cord tires, is embedded within the center of the tire. As is well known in the art, cord fabric such as used in the manufacture of cord tires comprises a multiplicity of small cords laid parallel and often held in such relation by a number of small crossing threads. In the manufacture of the improved form of band, cord fabric, rubberized by calendering a highly resilient grade of rubber thereon and cut into a long narrow strip, is wound about the tire during the building up of the tire a sufficient number of times to give a plurality of layers at every point about the band, imparting the required strength to the structure. In forms which have been successfully used by me, twelve layers or turns of cord fabric prepared and laid up in the manner described have been incorporated in the tire and have given the required strength thereto. The layers of cord fabric are indicated in the drawings by the numeral 13.

Other forms of fabric or reinforcement may be used in place of the cord fabric which has been specifically described and such equivalent material is intended to be covered herein.

On both sides of the fabric layers 13 are placed layers of heavier fabric 14 such as used in the manufacture of tires and known as "breaker" fabric. This fabric has heavy cords spaced apart and is rubberized and preferably cut at an angle to the plane of the tire, the purpose of the breaker fabric being to prevent the separation of the body of the tire and the fabric reinforce 13. Between the breaker strips 14 and the fabric reinforce 13 are placed layers 15 of highly resilient rubber, known as cushion rubber. The entire band is vulcanized as a single unit, and being without any joints or splices, will not be easily worn out or destroyed.

It will be observed that the cord reinforcement in the tractor band is located at considerable depth below the tread surface of the band and approximately in alignment with the points where the band enters the grooves in the wheels. This location of the cord reinforcement is an important feature of the band construction as it is at the neutral point in the tire, that is to say, at the point in which the action is at the minimum. By so locating the reinforcement for the band, the tendency of the cords to separate from the rubber is reduced to a negligible amount so that the life of the band is increased.

The invention may be embodied in different forms from that shown herein, and such modifications and alterations as may be suggested to one skilled in the art are intended to be covered herein.

What is claimed is:

1. An endless band of a tough, resilient tread rubber and fabric reinforcing material located at the center of the band, said material comprising a plurality of separate parallel cords running longitudinally of the band and constituting a single strip which is wound about the band a number of times to give a plurality of layers through the whole of the band.

2. An endless band for tractors, the band being composed of tough, resilient rubber, and a cord reinforcement embedded in the rubber at the center of the band comprising a plurality of cotton cords placed closely together and arranged longitudinally of the band to prevent elongation thereof and breaker strips arranged on either side of the said reinforcement.

3. An endless band, comprising a body portion of solid, tough, resilient rubber, and a reinforcement located at and confined to the neutral area in the band, said reinforcement comprising a plurality of layers of cord parallel to the band, the cords being coated with highly resilient rubber.

4. An endless band, comprising a body portion of solid, tough, resilient rubber, the inner surface of the band having sides sloping to the edges of the band, and a reinforcement located at and confined to the neutral area in the band, said reinforcement comprising a plurality of layers of cord parallel to the band, the cords being coated with highly resilient rubber.

5. An endless band, comprising a body portion of solid, tough, resilient rubber, the inner surface of the band having sides sloping to the edges of the band and notched to permit flexing of the band, and a reinforcement located at and confined to the neutral area in the band, said reinforcement comprising a plurality of layers of cord parallel to the band, the cords being coated with highly resilient rubber.

GEORGE I. WORLEY